United States Patent
Kulkarni et al.

(10) Patent No.: US 10,574,727 B2
(45) Date of Patent: Feb. 25, 2020

(54) MIB DATA BROADCAST USING INEXPENSIVE METHOD INCORPORATING MICROCONTROLLER AND FPGA

(71) Applicant: Honeywell International, Inc., Morris Plains, NJ (US)

(72) Inventors: Amit Kulkarni, Hyderabad (IN); Sameer D. Manikfan, Hyderabad (IN); Raja Sekhar Chanapathi, Telangana (IN); Parimal Kulkarni, Pune (IN)

(73) Assignee: Honeywell International Inc., Morris Plains, NJ (US)

( * ) Notice: Subject to any disclaimer, the term of this patent is extended or adjusted under 35 U.S.C. 154(b) by 800 days.

(21) Appl. No.: 14/919,519

(22) Filed: Oct. 21, 2015

(65) Prior Publication Data

US 2017/0118270 A1 Apr. 27, 2017

(51) Int. Cl.
  *H04L 29/08* (2006.01)
  *H04L 12/26* (2006.01)
  *H04L 5/00* (2006.01)
  *H04L 12/861* (2013.01)
  *H04L 12/24* (2006.01)

(52) U.S. Cl.
  CPC ............ *H04L 67/06* (2013.01); *H04L 5/0044* (2013.01); *H04L 43/08* (2013.01); *H04L 49/90* (2013.01); *H04L 41/0233* (2013.01)

(58) Field of Classification Search
  CPC ....... H04L 67/06; H04L 5/0044; H04L 43/00; H04L 43/10
  See application file for complete search history.

(56) References Cited

U.S. PATENT DOCUMENTS

| 6,714,552 B1 * | 3/2004 | Cotter ................. H04L 45/02 370/256 |
| 7,206,251 B1 * | 4/2007 | Yu ..................... G11C 8/16 365/189.16 |
| 7,233,986 B1 * | 6/2007 | Jair ................... H04L 41/0213 709/212 |
| 7,457,857 B1 * | 11/2008 | Crayford ............ H04L 41/022 370/401 |
| 7,693,158 B1 * | 4/2010 | Carrie ................ H04L 12/4641 370/395.53 |

(Continued)

OTHER PUBLICATIONS

Broadcom Connecting Everything; "Nine-Port Managed 10/100 Switch with IEEE 802.1/P/X/Q VLAN"; BCM 5338M Product Brief; 2004; 2 pages.

*Primary Examiner* — Philip C Lee

(57) ABSTRACT

An apparatus includes a microcontroller (404) configured to read from a Management Information Base (MIB) register (410) of an Ethernet switch (402) to obtain MIB statistic data (412) regarding a first Ethernet port of the Ethernet switch. The microcontroller is configured to transmit the obtained MIB statistic data to a field programmable gate array (FPGA) (406). The FPGA is configured to receive and store the obtained MIB statistic data in a buffer memory (418). The FPGA is configured to encapsulate the obtained MIB statistic data in an Ethernet frame (426). The FPGA is configured to determine a vacant time slot during which the Ethernet switch is not transmitting data to an external device (524). The FPGA is configured to transmit the Ethernet frame to the external device during the vacant time slot.

19 Claims, 6 Drawing Sheets

(56) References Cited

U.S. PATENT DOCUMENTS

| | | | |
|---|---|---|---|
| 8,051,160 B2 | 11/2011 | Crayford et al. | |
| 2002/0199063 A1* | 12/2002 | Chaudhry | G06F 9/383 |
| | | | 711/122 |
| 2003/0235216 A1* | 12/2003 | Gustin | H04J 3/0697 |
| | | | 370/509 |
| 2006/0002256 A1* | 1/2006 | Kamio | H04N 5/765 |
| | | | 369/47.1 |
| 2006/0133287 A1* | 6/2006 | Nishi | H04L 43/0817 |
| | | | 370/251 |
| 2007/0028015 A1* | 2/2007 | Wickham | G06F 13/385 |
| | | | 710/52 |
| 2007/0067130 A1* | 3/2007 | Toda | H04L 12/2697 |
| | | | 702/108 |

* cited by examiner

MIB DATA BROADCAST USING INEXPENSIVE METHOD INCORPORATING MICROCONTROLLER AND FPGA

TECHNICAL FIELD

This disclosure is generally directed to communication networks. More specifically, this disclosure is directed to an apparatus and method for Management Information Base (MIB) data broadcast that incorporates use of inexpensive microcontroller and field programmable gate array (FPGA) components.

BACKGROUND

Communication networks, such as computer networks, use switches, routers, and other devices to carry information across the networks. A switch or router typically receives information in a network, identifies a destination for the information, and then forwards the information to the destination. This forwarding can be either directly to the destination or indirectly through one or more other devices.

A control firewall can be disposed between different networks to control communications between the different networks. The control firewall determines whether to allow or disallow a communication to pass from one network to another network. The control firewall can include a control firewall module that includes an Ethernet switch. The Ethernet switch includes an integrated circuit (IC). The BROADCOM CORPORATION has manufactured the BCM5338M Ethernet switch on an IC chip, which is an example of an Ethernet switch IC included in a control firewall module. This Ethernet switch IC (BCM5338M) has a feature to automatically broadcast Management Information Base (MIB) information encapsulated in an Ethernet frame at regular time interval. This feature is named MIB Autocast. Due to component obsolescence, the Ethernet switch IC (BCM5338M) needs to be replaced with an updated Ethernet switch IC. The updated Ethernet switch IC selected as a replacement may not include the MIB Autocast feature, and as a result, does not provide backwards compatibility with an existing system.

SUMMARY

This disclosure provides an apparatus and method for Management Information Base (MIB) data broadcast that incorporates use of inexpensive microcontroller and field programmable gate array (FPGA) components.

In a first example, a method includes reading from a MIB register of an Ethernet switch to obtain MIB statistic data regarding a first Ethernet port of the Ethernet switch. The method includes storing the obtained MIB statistic data in a buffer memory. The method includes encapsulating the obtained MIB statistic data in an Ethernet frame. The method includes determining a vacant time slot during which the Ethernet switch is not transmitting data to an external device. The method includes transmitting the Ethernet frame to the external device during the vacant time slot.

In a second example, an apparatus includes a microcontroller and a FPGA. The microcontroller is configured to read from a MIB register of an Ethernet switch to obtain MIB statistic data regarding a first Ethernet port of the Ethernet switch. The microcontroller is configured to transmit the obtained MIB statistic data to a FPGA. The FPGA is configured to receive and store the obtained MIB statistic data in a buffer memory. The FPGA is configured to encapsulate the obtained MIB statistic data in an Ethernet frame. The FPGA is configured to determine a vacant time slot during which the Ethernet switch is not transmitting data to an external device. The FPGA is configured to transmit the Ethernet frame to the external device during the vacant time slot. Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 9, discussed below, and the various examples used to describe the principles of the present invention in this patent document are by way of illustration only and should not be construed in any way to limit the scope of the invention. Those skilled in the art will understand that the principles of the present invention may be implemented in any suitable manner and in any type of suitably arranged device or system.

Figure 1:
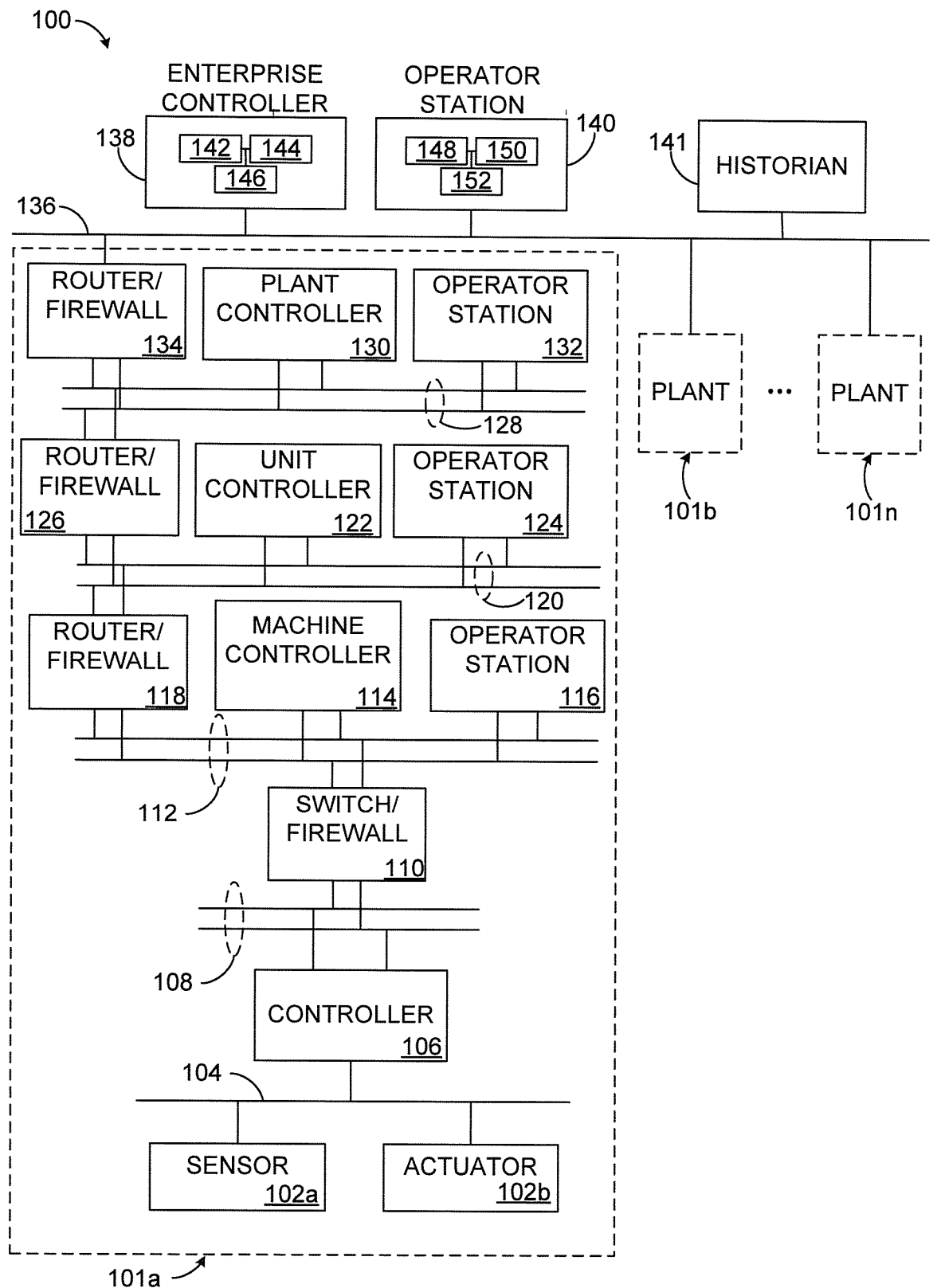
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. In certain embodiments, the switch/firewall 110 device is a control firewall module that regulates traffic between an uplink server (e.g., EXPERION® Process Knowledge Management System (EPKS) server) and downlink controllers (e.g., C300 controllers or controller 106) in a HONEYWELL Series C system. In certain embodiments, the switch/firewall 110 device includes an Ethernet switch IC, such as the BROADCOM BCM5338M Ethernet switch on an IC chip, that includes a feature to automatically broadcast MIB information encapsulated in an Ethernet frame at regular time intervals (i.e., MIB Autocast feature).

In other embodiments, the switch/firewall 110 device includes an Ethernet switch IC, such as the BROADCOM BCM53282M Ethernet switch on an IC chip, that does not include the MIB Autocast feature. As a specific example, the owner of the system 100 may consider the BROADCOM BCM5338M Ethernet switch on an IC chip to be near its end of life or obsolete, replace it with an updated Ethernet switch IC that does not support the MIB Autocast feature, and thereby create a need for the switch/firewall 110 to be redesigned to support the MIB Autocast feature in order to provide backward compatibility with the existing system and the updated Ethernet switch IC. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/ firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102*a*, and actuators 102*b*).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101*a*-101*n*, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101*a*-101*n* and to control various aspects of the plants 101*a*-101*n*. The enterprise-level controllers 138 can also perform various functions to support the operation and control of components in the plants 101*a*-101*n*. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101*a* is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers could include one or more processing devices 142 and one or more memories 144 for storing instructions and data used, generated, or collected by the processing device(s) 142. Each of the controllers could also include at least one network interface 146, such as one or more Ethernet interfaces or wireless transceivers. Also, each of the operator stations could include one or more processing devices 148 and one or more memories 150 for storing instructions and data used, generated, or collected by the processing device(s) 148. Each of the operator stations could also include at least one network interface 152, such as one or more Ethernet interfaces or wireless transceivers.

As noted above, backwards compatibility with an existing system is a concern when replacing obsolete components in industrial process control and automation systems, and various components in FIG. 1. When various components in FIG. 1 depend upon the MIB Autocast feature provided by an Ethernet switch IC within the a control firewall device, then replacing the obsolete Ethernet switch IC with an updated Ethernet switch IC may require the control firewall device to be redesigned to the provide MIB Autocast feature for backward compatibility.

This disclosure provides techniques for maintaining secure communications within an industrial process control and automation system. More particularly, this disclosure provides an apparatus and method for Management Information Base (MIB) data broadcast that incorporates use of inexpensive microcontroller and field programmable gate array (FPGA) components. Additional details regarding this functionality are provided below.

Although FIG. 1 illustrates one example of an industrial process control and automation system 100, various changes may be made to FIG. 1. For example, a control system could include any number of sensors, actuators, controllers, servers, operator stations, networks, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, process control systems are highly configurable and can be configured in any suitable manner according to particular needs. In addition, FIG. 1 illustrates an example environment in which a Management Information Base (MIB) data broadcast that incorporates use of inexpensive microcontroller and field programmable gate array (FPGA) components can be used. This functionality can be used in any other suitable device or system.

Figure 2:
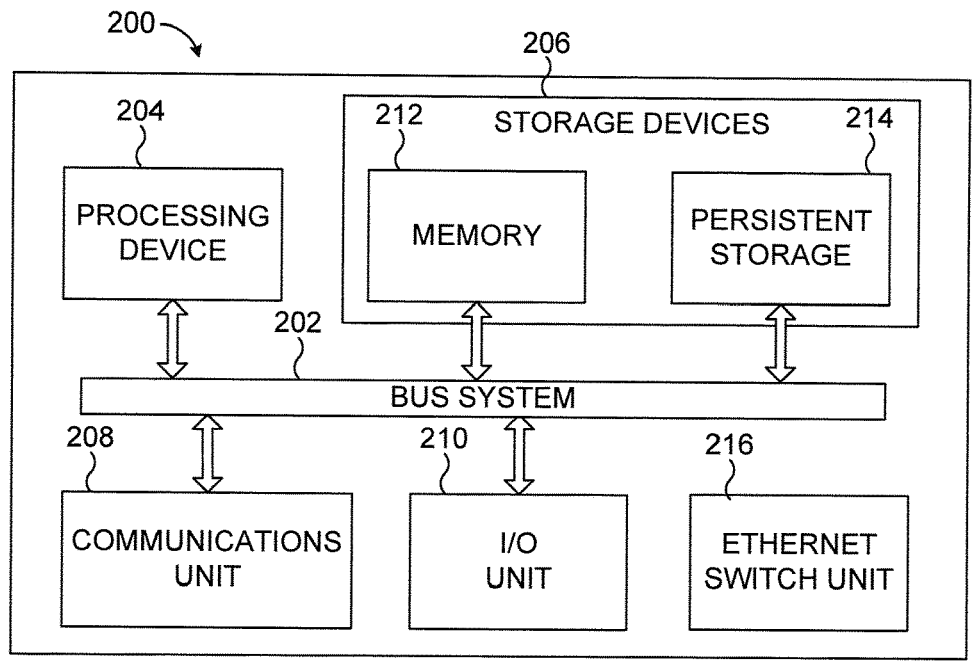
FIG. 2 illustrates an example computing device supporting Management Information Base (MIB) data broadcast that incorporates use of inexpensive microcontroller and field programmable gate array (FPGA) components according to this disclosure.

FIG. 2 illustrates an example computing device 200 supporting Management Information Base (MIB) data broadcast that incorporates use of inexpensive microcontroller and field programmable gate array (FPGA) components according to this disclosure. The computing device 200 could, for example, represent any suitable computing device in the system 100 of FIG. 1. For example, the computing device 200 could represent any of the controllers or other devices illustrated in FIG. 1.

As shown in FIG. 2, the computing device 200 includes a bus system 202, which supports communication between at least one processing device 204, at least one storage device 206, at least one communications unit 208, and at least one input/output (I/O) unit 210. The processing device 204 executes instructions that may be loaded into a memory 212. The processing device 204 may include any suitable number(s) and type(s) of processors or other devices in any suitable arrangement. Example types of processing devices 204 include microprocessors, microcontrollers, digital signal processors, field programmable gate arrays, application specific integrated circuits, and discrete circuitry.

The memory 212 and a persistent storage 214 are examples of storage devices 206, which represent any structure(s) capable of storing and facilitating retrieval of information (such as data, program code, and/or other suitable information on a temporary or permanent basis). The memory 212 may represent a random access memory or any other suitable volatile or non-volatile storage device(s). The persistent storage 214 may contain one or more components or devices supporting longer-term storage of data, such as a read only memory, hard drive, Flash memory, or optical disc.

The communications unit 208 supports communications with other systems or devices. For example, the communications unit 208 could include a network interface card that facilitates communications over at least one Ethernet network. The communications unit 208 could also include a wireless transceiver facilitating communications over at least one wireless network. The communications unit 208 may support communications through any suitable physical or wireless communication link(s).

The I/O unit 210 allows for input and output of data. For example, the I/O unit 210 may provide a connection for user input through a keyboard, mouse, keypad, touchscreen, or other suitable input device. The I/O unit 210 may also send output to a display, printer, or other suitable output device.

The computing device 200 also includes at least one Ethernet switch unit 216 configured to support the MIB Autocast feature. As described above, the Ethernet switch unit 216 could be used for MIB data broadcast related to the computing device 200. For example, the Ethernet switch unit 216 enables the device 200 to obtain MIB information at downlink ports and broadcast the MIB information encapsulated in an Ethernet frame at a regular time interval. The Ethernet switch unit 216 represents any suitable hardware configured to provide an MIB Autocast operation, such as by hardware providing an MIB Autocast backward compatibility to an updated Ethernet switch IC without an MIB Autocast feature.

Although FIG. 2 illustrates one example of a computing device 200 supporting MIB data broadcast that incorporates use of inexpensive microcontroller and field programmable gate array (FPGA) components for industrial devices, various changes may be made to FIG. 2. For example, various components in FIG. 2 could be combined, further subdivided, or omitted and additional components could be added according to particular needs. Also, computing devices can come in a wide variety of configurations, and FIG. 2 does not limit this disclosure to any particular configuration of computing device.

Figure 3:
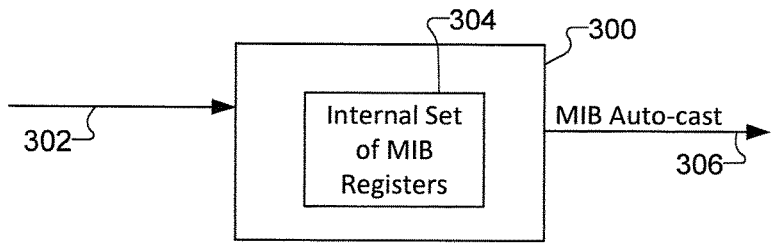
FIG. 3 illustrates an example of an Ethernet switch IC that includes an MIB Autocast feature.

FIG. 3 illustrates an example of an Ethernet switch IC 300 that includes an MIB Autocast feature. This Ethernet switch IC 300 shown in FIG. 3 is for illustration only.

The Ethernet switch IC 300 includes multiple Ethernet ports, such as an uplink Ethernet port that transmits uplink traffic and multiple downlink Ethernet ports that receive downlink traffic 302. In certain embodiments, the uplink Ethernet port connects to and transmits to an uplink server, such as the machine-level controllers 114 or a server of an EXPERION Process Knowledge Management System.

The Ethernet switch IC 300 also includes MIB Counters used for monitoring and analyzing network performance at the multiple ports, and generating MIB statistics diagnostic information quantifying the analysis of the network performance. The MIB statistics can include a total number of packets received, total number of packets transmitted, number of broadcast, multicast and unicast packets received and transmitted, and number of packets received and transmitted having different packet sizes. The MIB counters are also used for detecting network anomalies such as received dropped packets, source address changes, undersize packets, oversize packets, fragments having packet size less than a minimum Ethernet frame size of 64 bytes, alignment errors, frame check sequence errors, symbol errors, collisions on transmit interface (single as well as multiple), and discarded packets. Certain components in the system 100 rely on the MIB statistics for network management of fault tolerant Ethernet (FTE) networks. The Ethernet switch IC 300 stores the MIB statistics in its internal set of MIB registers 304 for each of the ports.

The Ethernet switch IC 300 creates an Ethernet packet 306 including the MIB statistics for a particular port, and then automatically (i.e., without external hardware or software intervention) transmits the Ethernet packet 306 to an external device, such as an uplink server. That is, the MIB Statistics are encapsulated in an Ethernet Frame and multicast with a destination address set to a multicast address via the uplink port. The MAC address or IP address that the Ethernet switch IC 300 includes within the Ethernet packet is obtained at an initial configuration level. The Ethernet switch IC 300 periodically transmits an Ethernet packet for each of the nine ports according to a cycle. As a specific example, the cycle may include a short interval (e.g., 26.5-30 seconds) during which nine Ethernet frames are transmitted. The short interval can include approximately 12 seconds of no transmission followed by a sequence of transmissions of a single frame about every 2-3 seconds, wherein each single frame corresponds to a different one of the nine ports.

Figure 4:
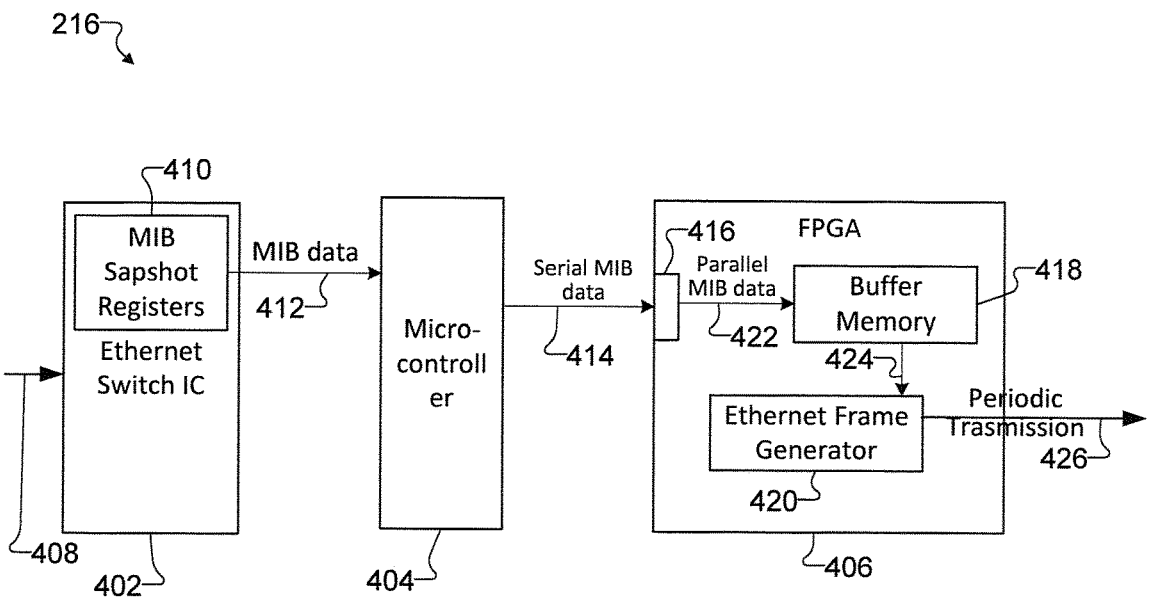
FIGS. 4 and 5 illustrate the Ethernet switch unit of FIG. 3 in more detail according to this disclosure.
Figure 5:
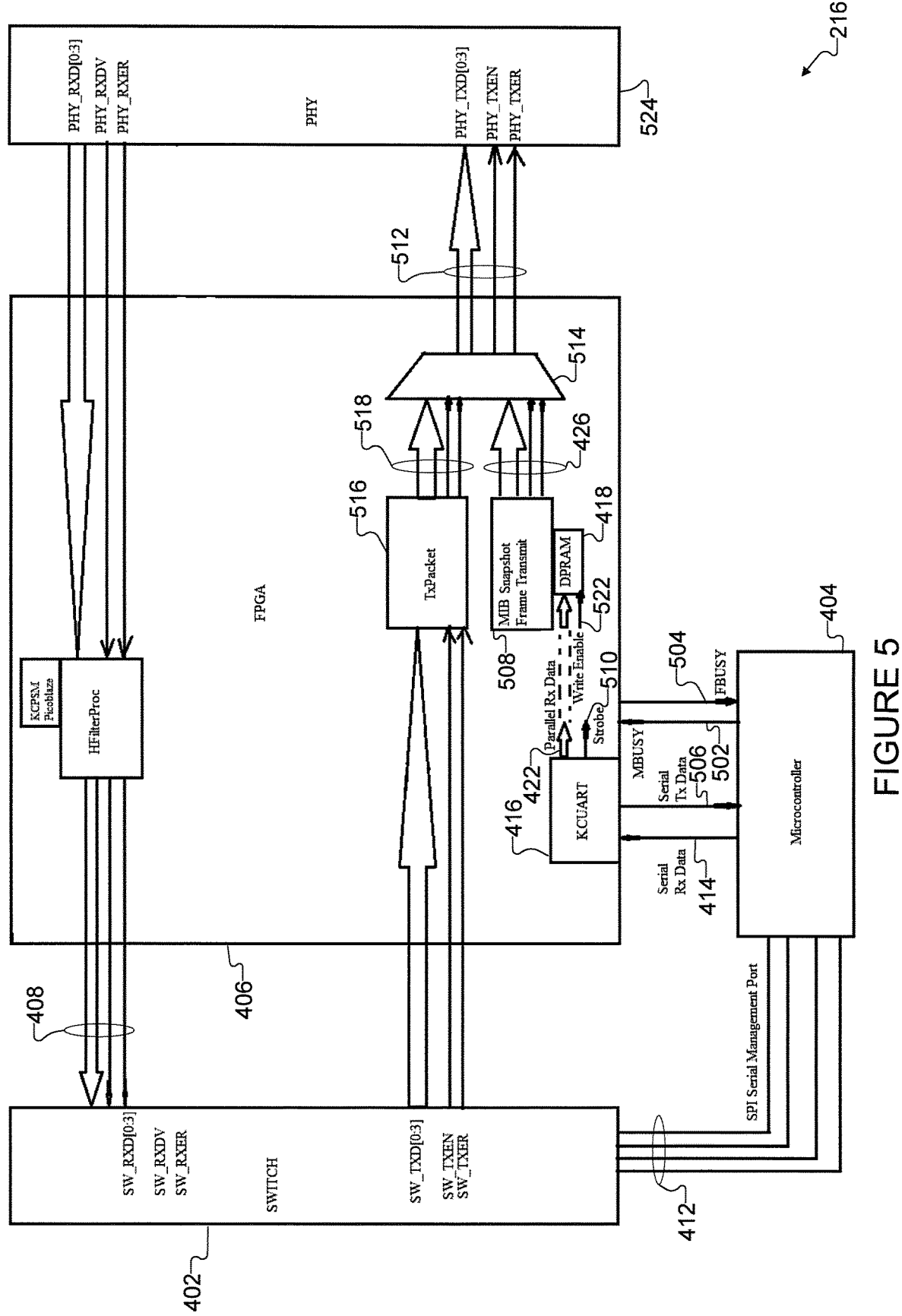

FIGS. 4 and 5 illustrate the Ethernet switch unit 216 of FIG. 3 in more detail according to this disclosure. FIG. 4 illustrates the Ethernet switch unit 216, and FIG. 5 illustrates the Ethernet switch unit 216 connected to an external device. The Ethernet switch unit 216 can replace the Ethernet switch IC 300 of FIG. 3. The Ethernet switch unit 216 includes an Ethernet switch IC 402 that does not include the MIB Autocast feature, a microcontroller 404, and an FPGA 406.

The Ethernet switch IC 402 represents an updated Ethernet switch IC as described above. As a specific example, the Ethernet switch IC 402 can represent the BROADCOM BCM53282M Ethernet switch on an IC chip. The Ethernet switch IC 402 includes multiple Ethernet ports for transmitting uplink traffic and receiving downlink traffic 408. The Ethernet switch IC 402 includes MIB counters, as described above, that generate MIB statistics for each of the multiple Ethernet ports. Also, the Ethernet switch IC 402 includes MIB snapshot registers 410 that store the MIB statistics for each of the ports. The MIB snapshot registers 410 are similar to the internal set of MIB registers 304. The MIB snapshot registers 410 enable the stored MIB statistics data (referred to as input 412 to the microcontroller 404) to be read by software and encapsulated in an Ethernet frame using external hardware or software.

The microcontroller 404 is external to the Ethernet switch IC 402. The microcontroller 404 includes firmware for implementing the function of the microcontroller. The microcontroller 404 reads MIB statistics from the MIB snapshot registers 410 within the Ethernet switch IC 402 as input 412. Then, the microcontroller 404 sends the MIB statistics to the FPGA 406 as output 414. For example, the microcontroller 404 can send the MIB statistics to the FPGA 406 periodically according to a cycle, for example, sending the MIB statistics for one port at a time after every 2 seconds. (e.g., every 2 seconds read MIB statistics from one port and transmit one frame in 20.48 microseconds (p)). In certain embodiments, the microcontroller 404 reads the MIB statistics associated with each transmit (Tx) and receive (Rx) port in a consecutive manner. For example, the microcontroller 404 can read MIB statistics corresponding to one Ethernet port, and then read MIB statistics corresponding to another Ethernet port, and so forth until MIB statistics corresponding to each of the ports has been read, and then repeat the reading cycle. In certain embodiments, in order to maintain backwards compatibility with a legacy design, the microcontroller 404 waits for 7.5 seconds after the MIB statistics and generic routing encapsulation (GRE) header data corresponding to 9 ports are transmitted to the FPGA 406 because the legacy design transmits MIB Autocast frames (such as Ethernet packet 306) every 25.6 seconds.

The FPGA 406 includes an interface 416, a buffer memory 418, and an Ethernet Frame Generator 420. The FPGA 406 also includes a Register Transfer Level (RTL) digital implementation that implements packet filtering functions. The interface 416 receives the MIB statistics data output 414 from the microcontroller 404 in a serial type data format, converts the received MIB statistics data to a parallel type data format, and transmits the converted MIB statistics data 422 to the buffer memory 418. More particularly, the interface 416 writes the converted MIB statistics data 422 to the buffer memory 418. The Ethernet Frame Generator 420 generates an Ethernet frame, reads the converted MIB statistics data 424 from the buffer memory 418, encapsulates MIB statistics data 424 within the generated Ethernet frame, and transmits the Ethernet frame 426 over a transmit (Tx) MII interface to an external device, such as an uplink server of PHY. For example, after raw MIB statistics data and GRE header information corresponding to one port is received, the FPGA 406 reads it and transmits on the Tx MII interface towards the external device. Note that the raw MIB statistics data and GRE header information corresponding to one port refers to the converted MIB statistics data 424 received by and read from the buffer memory.

Although other solutions could implement the functions of the FPGA 406 entirely in software of a microprocessor, such solutions introduce additional latency in processing the Ethernet frame in software. Other solutions that use an external Ethernet Media Access Controller (MAC) chip add costs to the system, yet the RTL digital implementation in the FPGA 406 avoids such additional costs and performs packet filtering functions. That is, the FPGA 406 enables MIB statistics multicast without adding any additional hardware components (e.g., MAC chip). In certain embodiments, the FPGA 406 utilizes as low as 260 slices in a XILINX Spartan IIE/Spartan III FPGA to implement the function. The FPGA 406 also ensures that no additional points of failure (components) are introduced in the Ethernet switch unit 216, and hence the FPGA 406 has a lower Failure in Time (FIT) rate and a higher Mean Time Before Failure as compared to the other solutions that use external MAC controllers. The FPGA 406 does not increase the power consumption of the system as would have been the case of another solution that includes an external MAC controller or another solution that includes a higher end microprocessor to implement similar function.

Referring to FIG. 5, the Ethernet switch IC 402 includes a receive (Rx) media-independent interface (MII) that receives the downlink traffic 408 through one or more ports. For example, the ports corresponding to the downlink traffic 408 receive receiver signals such as SW_RXD[0:3] data signals, SW_RXDV signals, and SW_RXER error signals.

The microcontroller 404 includes a serial peripheral interface (SPI) serial management port (SMP) that receives the MIB statistics data input 412 from the Ethernet switch IC 402 in a serial type data format. The microcontroller 404 includes two parallel port pins for exchanging handshaking signals with the FPGA 406, namely the MBUSY and FBUSY handshaking signals 502-504. Based on the MBUSY and FBUSY handshaking signals 502-504, the microcontroller 404 is able to communicate serial data with the FPGA 406 though the interface 416. For example, the microcontroller 404 sends the MBUSY handshaking signal 502 (for example, from a microcontroller parallel port pin) to the FPGA 406 indicating that the microcontroller 404 is busy reading from the Ethernet switch IC 402 or sending output 414 to the interface 416, which the FPGA 406 should buffer into the buffer memory 418. That is, microcontroller 404 ensures that the MBUSY handshaking signal 502 remains asserted during the transmission of 235 bytes to the interface 416. The microcontroller 404 de-asserts the MBUSY handshaking signal 502 after MIB statistics and header information corresponding to an entire MIB frame is transmitted to the interface 416.

After the FPGA 406 has received 235 bytes through the serial UART interface 416 and buffered the 235 bytes in the buffer memory 418, the FPGA 406 asserts the FBUSY handshaking signal 504 to indicate that the FPGA 406 is busy transmitting the data over an MII interface 512 towards a PHY. The microcontroller 404 receives the FBUSY handshaking signal 504 (for example, at a microcontroller parallel port pin) from the FPGA 406 indicating that the FPGA 406 is busy transmitting an Ethernet frame 426 via a PHY MII interface 512. More particularly, the microcontroller 404 refrains from sending data output 414 to the FPGA 406 when the FPGA 406 asserts or transmits the FBUSY handshaking signal 504 (FBUSY=1). After an entire MIB statistics data output 414 is transmitted towards the PHY external device 524, the FPGA 406 will de-assert the FBUSY handshaking signal 504. After 235 bytes are read out of buffer memory 418 and sent over the MII interface 512, the FPGA 406 de-asserts the FBUSY handshaking signal 504 to indicate to the microcontroller 404 that the FPGA 406 is ready to receive data output 414 through the interface 416. When the FBUSY handshaking signal 504 is de-asserted, the microcontroller 404 can start transmitting output 414 and asserting the MBUSY handshaking signal 502.

The interface 416 of the FPGA 406 can be a KCUART that provides a universal asynchronous receiver/transmitter (UART) functionality, such as translating data between serial and parallel formats. For example, the KCUART interface 416 can communicate with the microcontroller 404 at a baud rate of 9600 bits per second using a defined protocol, such as a protocol specifying one start bit, followed by eight data bits, followed by one stop bit. That is, the KCUART interface 416 includes a port for transmitting serial data (Serial Tx Data) 506 to the microcontroller 404, and another port for receiving serial data, namely, MIB statistics output 414 from the microcontroller 404. The KCUART interface 416 can communicate with the buffer memory 418 by transmitting the eight received data bits in parallel and transmitting a strobe pulse signal 510 as a definition of the byte boundary. The KCUART interface 416 sends the byte of converted MIB statistics 422 to the buffer memory 418 at a baud rate of 9600 bits per second. The information that the microcontroller 404 sends to the FPGA 406 over the serial UART interface includes the following:
  MAC Source Address;
  13 Fixed Bytes (All Zeroes);
  Microcontroller Revision (8 Bytes);
  FPGA Revision (8 Bytes);
  Switch Name (20 Bytes): FTE CONTROLFIREWALL9;
  Checksum (4 Bytes); and
  MIB Counters Data (176 Bytes).

The interface 416 monitors for valid bytes sent from the microcontroller 404 and validates Start, Data and Stop Bits received over the serial interface. The core of the KCUART interface 416 generates a 40 nanosecond strobe pulse signal 510 along with 8-bit parallel data. The strobe pulse signal 510 is output at the end of the byte wide data output. When the microcontroller 404 asserts the MBUSY handshaking signal 502, indicating a start of a UART transmission (namely, output 414), the FPGA 406 prepares to receive the bytes through the KCUART interface 416. The strobe pulse signal 510 indicates the byte end and is used to generate a write enable signal 522 (shown in FIG. 5) for the buffer memory 418 along with a write clock 604 (shown in FIG. 6) for a write address counter 602 (shown in FIG. 6). The buffer memory 418 receives a write clock signal and a write enable signal from the FPGA 406. That is, the FPGA 406 internally generates the write clock signal and the write enable signal.

In certain embodiments, the condition for writing to the buffer memory 418 is a rising edge of the write clock signal when the write enable signal 522 is asserted (i.e., high). When the write enable signal 522 is de-asserted, data will not be written into the buffer memory 418 even when there is a rising edge of the write clock. Also if there is no rising edge of the write clock signal, data will not be written into the buffer memory 418 even when the write enable signal 522 is asserted.

The buffer memory 418 can be a dual-port random access memory (DPRAM) that allows multiple reads or writes to occur at substantially the same time. The buffer memory 418 includes a port for storing MIB statistics (Parallel Rx Data) received from the KCUART interface 416. The buffer memory 418 includes another port for permitting stored data to be read, such as reading out the parallel formatted MIB statistics 422. The buffer memory 418 buffers 235 bytes for each port received from the microcontroller 404 via the UART serial interface 416.

The FPGA 406 includes an MIB Snapshot Frame Transmit block 508. The MIB Snapshot Frame Transmit block 508 includes the Ethernet Frame Generator 420, and thereby implements the functions of the Ethernet Frame Generator 420 described above. The MIB Snapshot Frame Transmit block 508 also includes a state machine 600 shown in and described below in reference to FIG. 6. The MIB Snapshot Frame Transmit block 508 reads the parallel formatted MIB statistics data 424 from the buffer memory 418 as a block, embeds standard Ethernet frame information (e.g., destination address or broadcast address) into the block to form an Ethernet packet or additionally embeds header information to form an Ethernet frame. The MIB Snapshot Frame Transmit block 508 outputs the Ethernet frame 426 to a multiplexer 514. The MIB Snapshot Frame Transmit block 508 can read MIB statistics data 424 from the buffer memory 418 at a speed, and transmit an Ethernet frame 426 to the external device 524 at a different speed by using two counters (shown in FIG. 6 as reference numbers 602 and 608) within the FPGA 406 that correspond to clocks at the different speeds. The MIB Snapshot Frame Transmit block 508 reads one byte at a time from the buffer memory 418 and transmits four bits at a time to the external device 524.

The FPGA 406 includes the transmit packet block 516, which reads a block of data from the Ethernet switch IC 402, and then adds standard Ethernet frame information to the block of data to form an Ethernet packet or additionally embeds header information to form an Ethernet frame 518. The transmit packet block 516 outputs the Ethernet frame 518 to the multiplexer 514.

The FPGA 406 includes the multiplexer 514, which receives the Ethernet frame 426 and forwards it to an external device 524 via the transmit MIT interface 512 during a vacant time slot. The vacant time slot is a period while the FPGA 406 is not transmitting data generated by the transmit packet block 516. For example, when the transmit packet block 516 outputs a TXEN signal that is low (i.e., having a value of zero), this is an indicator that the Ethernet switch IC 402 is not transmitting data to the external device 524, and thereby is an indicator of the vacant time slot. On the other hand, when the transmit packet block 516 outputs a TXEN signal that is high (i.e., having a value of one), this is an indicator that the Ethernet switch IC 402 is transmitting data 518 to the external device 524, and thereby is an indicator for the MIB Snapshot Frame Transmit block 508 to wait for a vacant time slot. In general, the Ethernet frame output by the multiplexer 514 is selected by the multiplexer 514 based on the value of the TXEN signal output from the transmit packet block 516, wherein a high value corresponds to outputting the Ethernet frame 426 and a low value corresponds to outputting the Ethernet frame 518.

The external device 524 is external to the Ethernet switch unit 216. For example, the external device 524 can be a PHY associated with an uplink server.

Although FIGS. 4 and 5 illustrate one example of an Ethernet switch unit and related details, various changes may be made to FIGS. 4 and 5. For example, the functional division shown in FIGS. 4 and 5 is for illustration only. Various components in FIGS. 4 and 5 could be combined, further subdivided, or omitted and additional components could be added according to particular needs.

Figure 6:
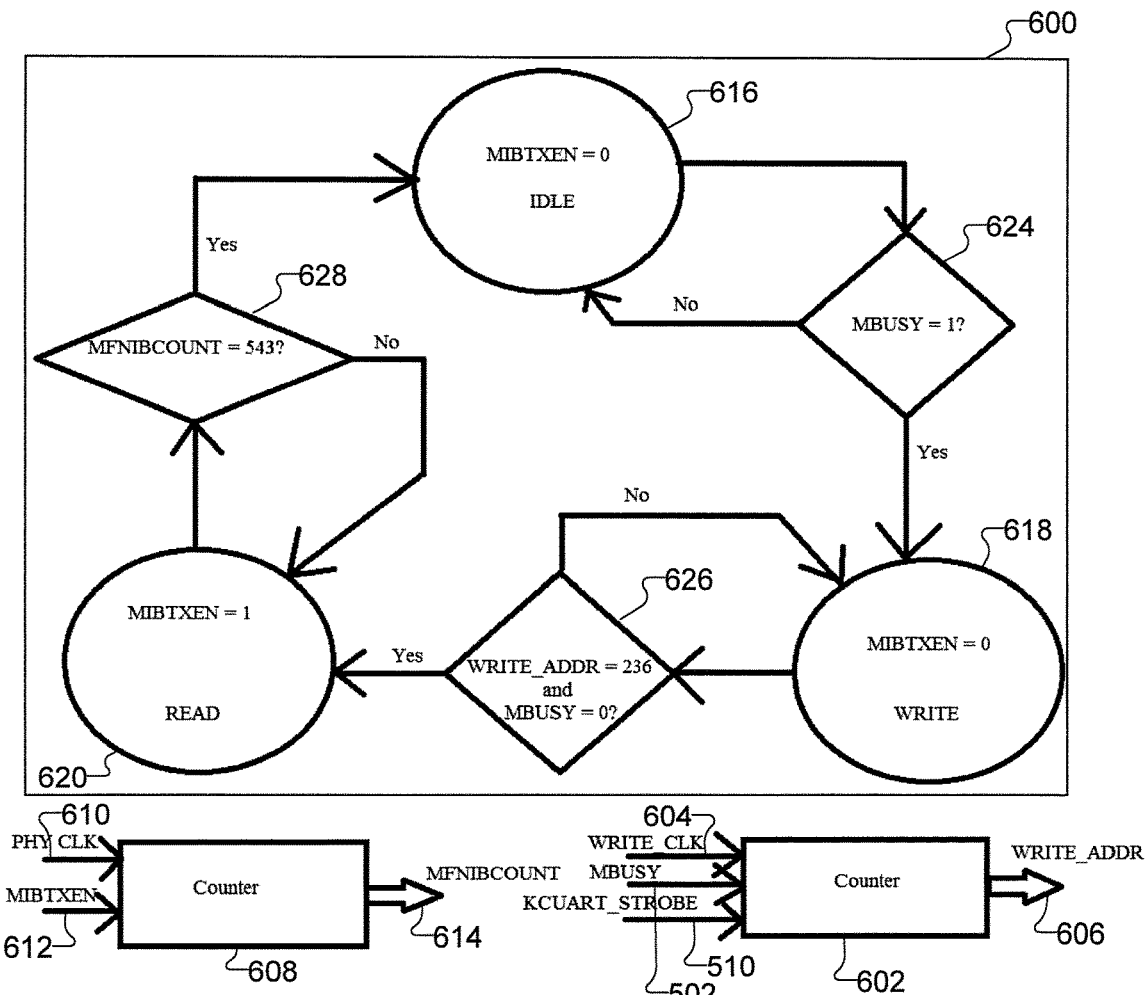
FIG. 6 illustrates an example state machine of a field programmable gate array according to this disclosure.

FIG. 6 illustrates an example state machine 600 of a field programmable gate array according to this disclosure. For simplicity of explanation, the state machine 600 will be described as implemented within the MIB Snapshot Frame Transmit block 508 of FIG. 5.

The FPGA 406 includes a write address counter 602 that receives inputs including the strobe pulse signal 510 from the KCUART interface 416, the MBUSY handshaking signal 502 from the microcontroller 404, and the write clock (WRITE_CLK) 604. The write address counter 602 counts a number of bytes of the MIB statistic data received from the microprocessor. The write address counter 602 determines the write address 606 where each byte of MIB statistics data will be written to or buffered in the buffer memory 418. More particularly, in response to receiving the strobe pulse signal 510, the write address counter 602 increments the write address 606 to store one byte of MIB statistics data for each port at a different address within the buffer memory 418. The write address counter 602 also uses the write clock 604 to increment the write address 606 value. In certain embodiments, the write address counter 602 increments the write address 606 value on the falling edge of the write clock 604. On the rising edge of write clock 604, data is written to the buffer memory 418 at the address location determined by the write address 606.

The write address counter 602 is affected by the write enable signal 522, which is a different signal than the write clock 604. For example, when the write enable signal 522 is de-asserted, the write address counter 602 will not increment the write address 606 value. The write enable signal 522 is input to buffer memory as well as to the write address counter 602. In certain embodiments, the write address counter 602 operates at a speed of 9600 bits per second.

The FPGA 406 includes a nibble counter 608. The nibble counter 608 receives inputs including a PHY clock signal 610 from the external device 524, and a MIB frame transmit enable (MIBTXEN) signal 612 generated internally in the FPGA 406 as an indicator of the time slot during which the Ethernet frame 426 is transmitted to the external device 524 over the single Tx MII interface 512. The nibble counter 608 generates a multiframe MIB Frame Nibble Count (MFNIB-COUNT) 614. The nibble counter 608 keeps track of each nibble (i.e., half-byte or 4 bits) transmitted to the PHY external device 524 via the MII interface 512. The nibble counter 608 may operate at a higher speed than the write address counter 602. In certain embodiments, the nibble counter 608 operates at a 25 megahertz speed according to the 25 MHz PHY TX Clock 610. The nibble counter 608 increments for every 4 bit nibble transmitted on the PHY MII interface 512. A total number of 520 nibbles (i.e., 260 bytes) transmitted on PHY interface includes 8 bytes of Preamble and start frame delimiter (SFD), 248 bytes of Ethernet MAC Frame Data (i.e., destination address (DA), source address (SA), TYPE, payload (PAYLD)) and four bytes of Frame Check sequence.

The multiplexer 514 multiplexes transmit signals from the transmit packet block 516 and the MIB Snapshot Frame Transmit block 508 on a signal Tx MII interface 512. Accordingly, the MIBTXEN signal 612 depends on the TXEN signal output from the transmit packet block 516. The MIBTXEN signal 612 is asserted only when both the TXEN signal from the transmit packet block 516 and the SW TXEN signal from the Ethernet switch IC 402 are de-asserted.

The MIB Snapshot Frame Transmit block 508 follows three states—IDLE 616, WRITE 618, and READ 620, according to the operation of its state machine 600. The default state of the state machine 600 is IDLE 616. This IDLE state 616 is entered on System Reset. The MIBTXEN signal 612 is low (MIBTXEN=0) in IDLE state 616. State transition from the IDLE state 616 to the WRITE state 618 is triggered by the MBUSY handshaking signal 502. In the IDLE state 616, MIB Snapshot Frame Transmit block 508 monitors 622 the MBUSY handshaking signal 502, and remains in the IDLE state 616 in response to determining 624 that the MBUSY handshaking signal 502 exhibits a low value. When the MIB Snapshot Frame Transmit block 508 determines 624 that the MBUSY handshaking signal 502 transitions to a high value (MBUSY=1), the state machine 600 changes to the WRITE state 618.

In the WRITE state 618, the MIBTXEN signal 612 remains de-asserted (MIBTXEN=0). The MBUSY handshaking signal 502 also remains asserted (MBUSY=1) when the microcontroller 404 performs a serial data transmission of its output 414. The microcontroller 404 sends raw MIB statistics and GRE header data to the serial UART port of the interface 416 in the WRITE state 618. The FPGA 406 remains in the WRITE state 618 until all of the 235 bytes (i.e., the MIB statistics data output 414 from the microcontroller 404 in a serial type data format) for a given port are received by the interface 416 from the microcontroller 404. Bytes (i.e., converted MIB statistics 422) received from the macro of the KCUART interface 416 are written into or transferred to the buffer memory 418 in the WRITE state 618. When all 235 bytes are transferred, the microcontroller 404 de-asserts the MBUSY handshaking signal 502. In the WRITE state 618, the FPGA 406 checks 626 for the following two conditions:

Write address 606 exceeds 235 (WRITE_ADDR=236); and

MBUSY handshaking signal 502 transitions to a low value (MBUSY=0), which triggers a state transition from WRITE 618 to READ 620.

In the READ state 620, the MIBTXEN signal 612 is asserted (MIBTXEN=1), which triggers the nibble counter 608 to increment the MFNIBCOUNT 614. In the READ state 620, the FPGA 406 reads converted MIB statistics data 424, generates the Ethernet frame 426, and transmits it through the transmit MII interface 512.

The Ethernet frame transmission starts with a Preamble, which is 7 bytes of 0x55, followed by SFD 0x5D. The FPGA 406 inserts these nibbles followed by the destination address, which is a fixed Multicast destination address, such as 01-00-5E-00-00-67. The next six bytes or 12 nibbles to be transmitted are the source address, which is a unique address for each control firewall module, such as each switch/firewall 110. The Source address is stored in the EEPROM and the content is read by the microcontroller 404 and stored in the buffer memory 418. The first three bytes of the Source Address is an Organizationally Unique Identifier (OUI), such as a HONEYWELL ID or OUI assigned for HONEYWELL (for example, 00-40-84). The last three bytes of the Source Address are different for each control firewall module.

After the Source Address, the FPGA 406 inserts the Type field (0x6559), the Null Checksum (0x0000), the GRE Protocol Indicator (0x0063), and the Status byte (0x20). These bytes are fixed and not fetched from the microcontroller 404.

Next, the FPGA 406 fetches 229 Bytes from the buffer memory 418. These bytes include the GRE header information, which includes a few bytes fixed by the microcontroller 404, the microcontroller revision and FPGA revision information, 20 bytes of switch name information, checksum followed by 176 bytes of MIB data received by the microcontroller 404 from Ethernet switch IC 402.

After the 176 bytes of MIB data, the FPGA 406 inserts the 32 Bit Frame Check Sequence (FCS) which is computed using the Institute of Electrical and Electronics Engineers (IEEE) 802.3 Standard compliant FCS cyclic redundancy check (CRC) generation macro.

In the READ state 620, the FPGA 406 determines 628 to remain in the READ state 620 while the MFNIBCOUNT 614 is less than its maximum value. State transition from READ 620 to IDLE 616 is triggered when the MFNIBCOUNT 614 reaches its maximum value of 543. The maximum number of nibbles is 544, which includes 520 nibbles of Ethernet MIB frame (including Preamble, SFD, Frame Check Sequence), and 24 nibbles of Inter frame gap (IFG). The 24 nibbles or 96 Bit duration of IFG is the minimum IFG specified in the IEEE 802.3 standard. The FPGA 406 remains in the IDLE state 616 as long as the MBUSY handshaking signal 502 remains de-asserted (MBUSY=0).

Although FIG. 6 illustrates one example of a state machine and related details, various changes may be made to FIG. 6. For example, the functional division shown in FIG. 6 is for illustration only. Various components in FIG. 6 could be combined, further subdivided, or omitted and additional components could be added according to particular needs.

Figure 7:
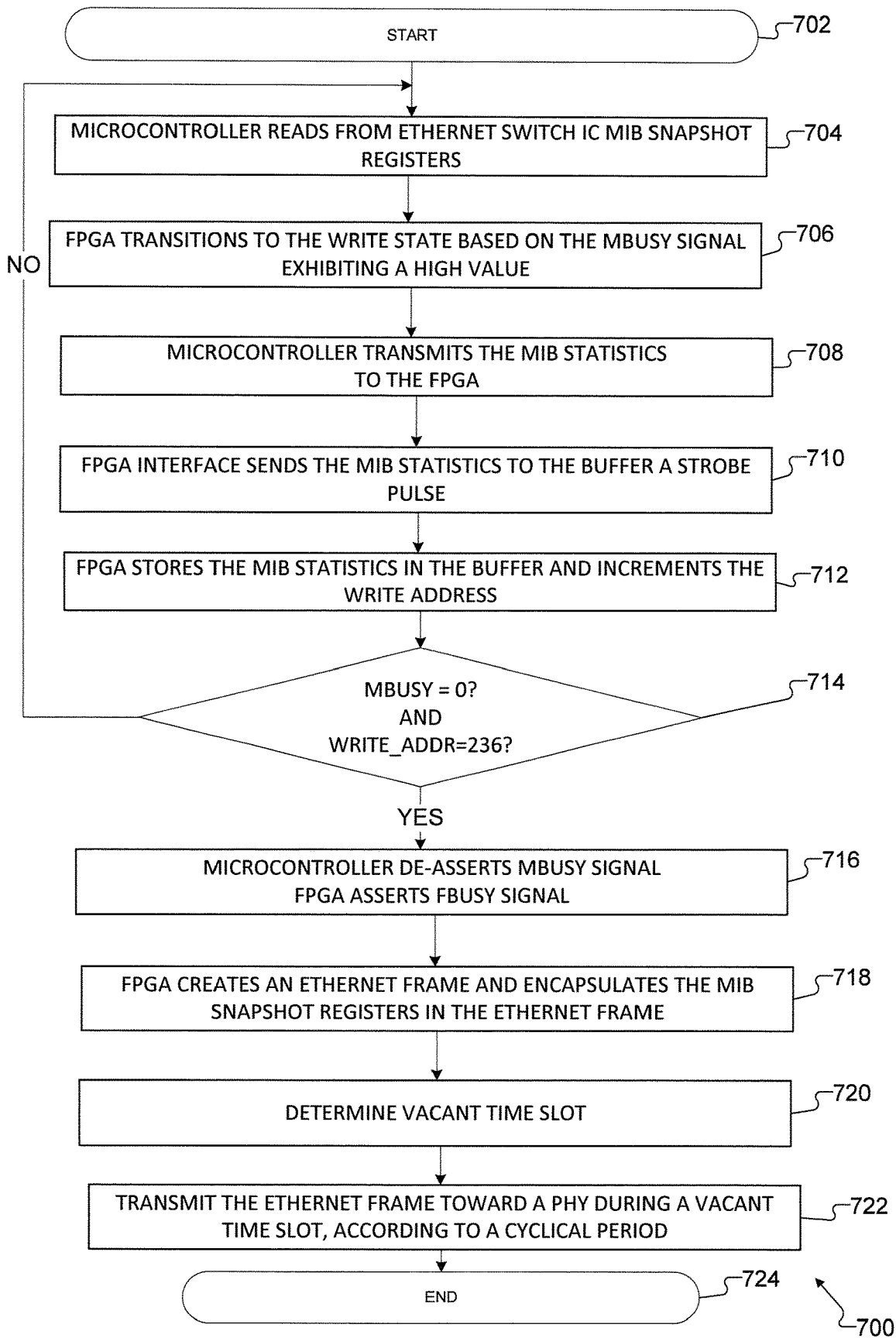
FIG. 7 illustrates an example method of operating an Ethernet switch unit according to embodiments of the present disclosure.

FIG. 7 illustrates an example method 700 of operating an Ethernet switch unit according to embodiments of the present disclosure. For simplicity of explanation, the method 700 will be described as implemented by the Ethernet switch unit 216. However, the method 700 could be implemented or performed by any other suitable device or system.

In block 702, the Ethernet switch unit 216 is reset such that the FPGA 406 is in the IDLE state 616, and no handshaking signals have been asserted. That is, the microcontroller 404 has not yet asserted the MBUSY handshaking signal 502.

In block 704, the microcontroller 404 reads from the MIB snapshot registers 410 to obtain MIB statistics 412 corresponding to one of the multiple Ethernet ports of the Ethernet switch IC 402. Also, the microcontroller 404 asserts the MBUSY handshaking signal 502 by transmitting a high value to the FPGA 406.

In block 706, the FPGA 406 determines 624 that the MBUSY handshaking signal 502 exhibits a high value, and in response, transitions to the WRITE state 618. In block 708, the microcontroller 404 transmits output 414, including the obtained MIB statistics 412, to the FPGA 406.

In block 710, in response to receiving the output 414, the serial port of the interface 416 automatically performs a translation between serial and parallel formats, generating converted MIB statistics 422 in a parallel form. The interface 416 sends a byte of the converted MIB statistics 422 to the buffer memory 418. The interface 416 also sends a strobe pulse signal 510 to the write address counter 602 of the FPGA 406, indicating the end of the parallel transmission of each byte of the converted MIB statistics 422.

In block 712, in response to receiving the strobe pulse signal 510, the write address counter increments the write address 606. The FPGA 406 stores the converted MIB statistics 422 in the buffer memory 418 at the write address 606.

In block 714, the FPGA 406 checks 626 whether both the write address 606 exceeds 235 and the MBUSY handshaking signal 502 exhibits a low value. The FPGA 406 remains in the WRITE state 618 until the microcontroller 404 finishes transmission of the 235 bytes of the output 414 (as indicated by de-assertion of the MBUSY=0) and until the interface 416 finishes storing the 235 bytes of converted MIB statistics 422 in the buffer memory 418. That is, the Ethernet switch unit 216 repeats the sub-process wherein (1) microcontroller 404 reads in input 412 and transmits output 414 to the FPGA 406; and (2) the FPGA 406, in response to receiving the output 414, translates it, and sends the converted data 422 to the buffer memory 418. Alternatively, in response to determining that MIB statistics and header information corresponding to an entire MIB frame has been transmitted from the microcontroller 404 to the interface 416, the method 700 proceeds to block 716.

In block 716, the microcontroller 404 de-asserts the MBUSY handshaking signal 502. While the MBUSY handshaking signal 502 has a low value, the microcontroller 404 refrains from sending data output 414 to the FPGA 406. Also in block 716, in response to determining that the FPGA 406 has received 235 bytes through the serial UART interface 416 and buffered the 235 bytes in the buffer memory 418, the FPGA 406 asserts the FBUSY handshaking signal 504.

In block 718, the FPGA 406 transitions to the READ state 620. The FPGA 406 reads the parallel formatted MIB statistics data 424 from the buffer memory 418, and generates an Ethernet frame 426 that encapsulates the read MIB statistics data 424.

In block 720, the FPGA 406 determines a vacant time slot during which the Ethernet switch IC 402 is not transmitting data 518 to an external device 524. That is, the FPGA 406 determines that the MIBTXEN signal 612 has a high value (MIBTXEN=1) and determines that the transmit packet block 516 outputs an indicator (i.e., TXEN signal having a low value) that the Ethernet switch IC 402 is not transmitting data to the external device 524, and thereby indicating the presence of a vacant time slot.

In block 722, the multiplexer 514 transmits the Ethernet frame 426 to the external device 524 from the MIB Snapshot Frame Transmit block 508. That is, the external device 524 receives an MIB Autocast signal from the MIB Snapshot Frame Transmit block 508. For example, the Ethernet frame transmitted from the MIB Snapshot Frame Transmit block 508 includes a specified number of nibbles, such as a maximum number of nibbles.

In block 724, the method 700 ends an MIB Autocast for one of the Ethernet ports of the Ethernet switch IC 402, and the method 700 prepares for an MIB Autocast of a different one of the Ethernet ports of the Ethernet switch IC 402. That is, the FPGA 406 de-asserts the FBUSY handshaking signal 504 (FBUSY=0) upon completing transmission of the specified number of nibbles, as indicated by a state machine 600 determination 628 that the MFNIBCOUNT 614 reached its maximum value.

Although FIG. 7 illustrates a series of steps, various steps in each figure could overlap, occur in parallel, or occur any number of times. Also, the method 700 can be repeated for each Ethernet port of the Ethernet switch IC 402.

Figure 8:
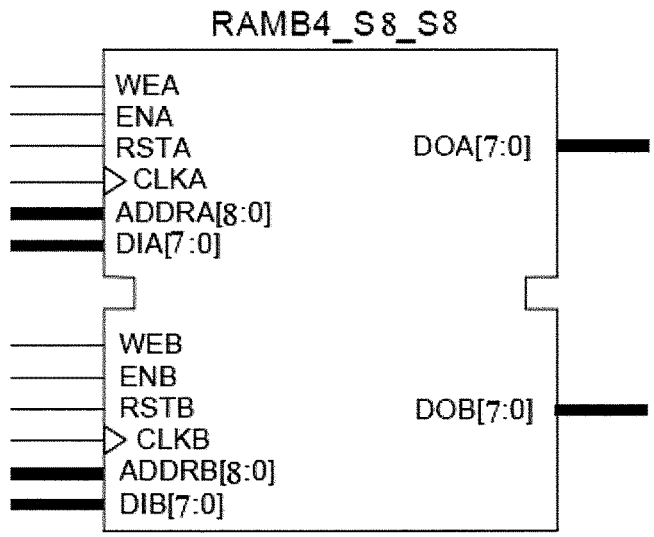
FIG. 8 illustrates an example DPRAM device according to this disclosure.

FIG. 8 illustrates an example DPRAM device 800 according to this disclosure. The DPRAM device 800 can represent the buffer memory 419 of FIGS. 4-5. The DPRAM device 800 is used for synchronization between the UART serial interface 416 and the MIT transmit interface 512 that output from the multiplexer 514.

Figure 9:
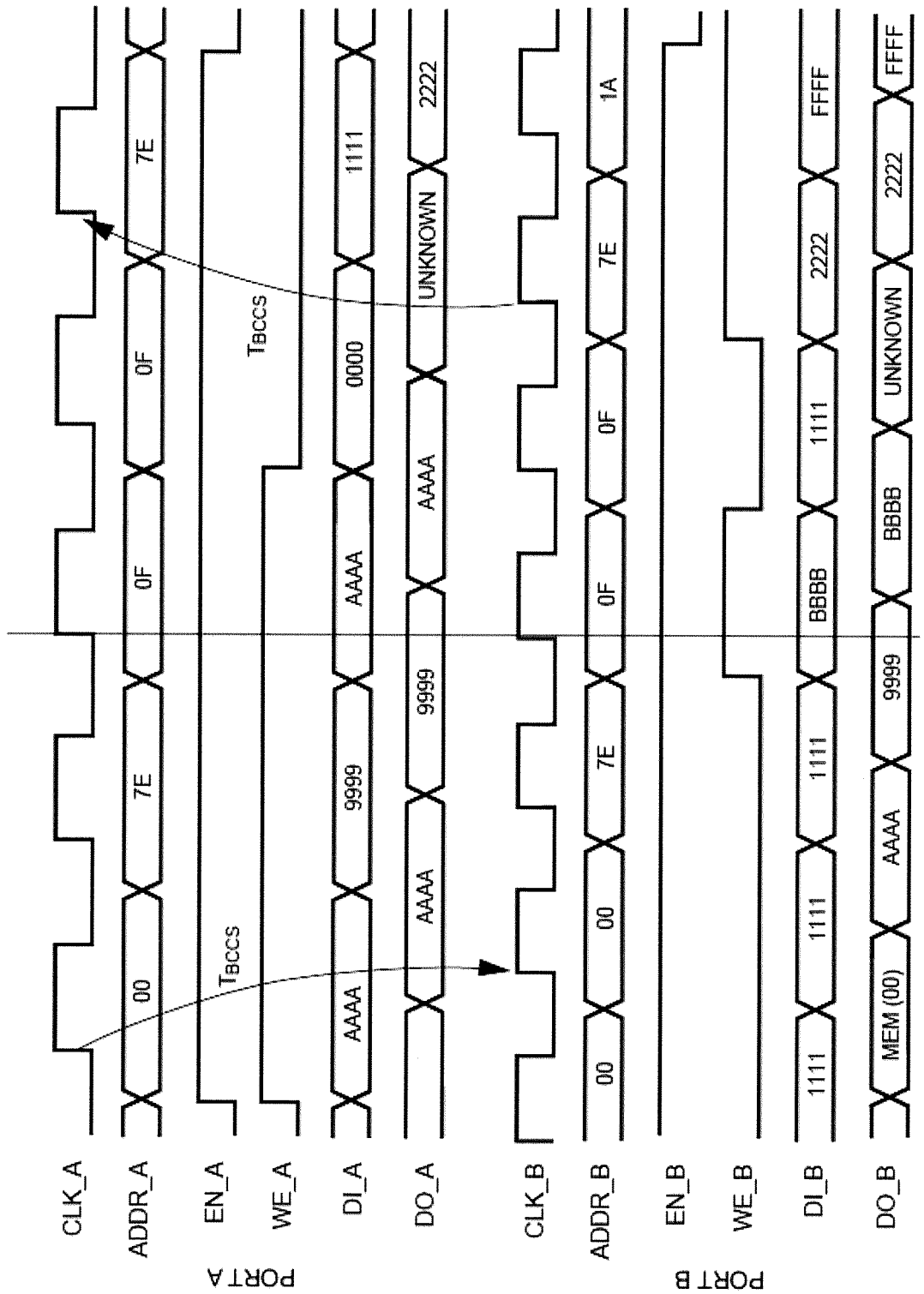
FIG. 9 illustrates an example timing diagram for the DPRAM device of FIG. 8.

FIG. 9 illustrates an example timing diagram for the DPRAM device of FIG. 8 and the universal asynchronous receiver/transmitter (UART) interface of FIGS. 4-5. FIG. 9 shows that one port (PORT A) of the DPRAM device 800 can operate according a clock (CLK_A) and the other port (PORT B) can operate according to a different clock (CLK_B).

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed:

1. A method comprising:
    reading, from a Management Information Base (MIB) register of an Ethernet switch for transporting data between networks, which does not include an MIB Autocast feature, by a microcontroller to obtain MIB statistic data regarding a first Ethernet port of the Ethernet switch;
    receiving by a Field Programmable Gate Array (FPGA) the MIB statistic data from the microcontroller in a serial type data format;
    converting by the Field Programmable Gate Array (FPGA) the received MIB statistic data from the serial type data format to a parallel type data format;
    storing the obtained MIB statistic data in a buffer memory;
    encapsulating the obtained MIB statistic data in an Ethernet frame;
    determining a vacant time slot during which the Ethernet switch is not transmitting data to an external device; and
    transmitting the Ethernet frame to the external device during the vacant time slot.

2. The method of claim 1, wherein the storing, the encapsulating, the determining, and the transmitting are performed by the field programmable gate array (FPGA).

3. The method of claim 2, further comprising: transmitting, by the microcontroller, the obtained MIB statistic data to the FPGA.

4. The method of claim 2, wherein the FPGA comprises:
    a universal asynchronous receiver/transmitter (UART) interface that includes a serial interface configured to communicate with the microcontroller and a parallel interface configured to communicate with the buffer memory;
    the buffer memory; and
    an Ethernet frame generator.

5. The method of claim 2, wherein the FPGA comprises:
    a write address counter configured to count a number of bytes of the MIB statistic data received from the microcontroller; and
    a nibble counter configured to count a number of nibbles of the Ethernet frame transmitted from the FPGA.

6. The method of claim 2, further comprising:
    in response to determining the microcontroller has completed transmission of a specified number of bytes of the MIB statistic data to the FPGA, de-asserting a first handshaking signal; and
    in response to determining the FPGA has completed storing the specified number of bytes of the MIB statistic data in the buffer memory, asserting a second handshaking signal.

7. The method of claim 1, wherein:
    transmitting the Ethernet frame further comprises: transmitting a specified number of nibbles; and
    the method further comprises: in response to determining that the specified number of nibbles has been transmitted, sending an indicator configured to enable receiving MIB statistic data regarding another Ethernet port of the Ethernet switch.

8. The method of claim 1, wherein the microcontroller is external to the Ethernet switch.

9. The method of claim 1, further comprising repeating the reading, the storing, the encapsulating, the determining, and the transmitting for each other Ethernet port of the Ethernet switch.

10. The method of claim 1, wherein the buffer memory includes a dual-port random access memory.

11. An apparatus comprising:
a microcontroller configured to:
read from a Management Information Base (MIB) register of an Ethernet switch for transporting data between networks, which does not include an MIB Autocast feature, by the microcontroller to obtain MIB statistic data regarding a first Ethernet port of the Ethernet switch, and
transmit the obtained MIB statistic data to a field programmable gate array (FPGA); and the FPGA configured to:
receive the MIB statistic data from the microcontroller in a serial type data format;
convert the received MIB statistic data from the serial type data format to a parallel type data format;
store the obtained MIB statistic data in a buffer memory,
encapsulate the obtained MIB statistic data in an Ethernet frame,
determine a vacant time slot during which the Ethernet switch is not transmitting data to an external device, and
transmit the Ethernet frame to the external device during the vacant time slot.

12. The apparatus of claim 11, wherein:
the microcontroller is further configured to de-assert a first handshaking signal upon completing transmission of a specified number of bytes of the MIB statistic data to the FPGA; and
the FPGA is further configured to assert a second handshaking signal upon completing storage of the specified number of bytes of the MIB statistic data in the buffer memory.

13. The apparatus of claim 12, wherein:
the FPGA is configured to transmit the Ethernet frame by transmitting a specified number of nibbles; and
the FPGA is further configured to: in response to determining that the specified number of nibbles has been transmitted, send an indicator configured to enable receiving MIB statistic data regarding another Ethernet port of the Ethernet switch.

14. The apparatus of claim 12, wherein the microcontroller is external to the Ethernet switch.

15. The apparatus of claim 14, the apparatus further configured to repeat the reading, the storing, the encapsulating, the determining, and the transmitting operations for each Ethernet port of the Ethernet switch.

16. The apparatus of claim 12, wherein the FPGA comprises:
a universal asynchronous receiver/transmitter (UART) interface that includes a serial interface configured to communicate with the microcontroller and a parallel interface configured to communicate with the buffer memory;
the buffer memory; and
an Ethernet frame generator.

17. The apparatus of claim 12, wherein the FPGA comprises:
a write address counter configured to count a number of bytes of the MIB statistic data received from the microcontroller; and
a nibble counter configured to count a number of nibbles of the Ethernet frame transmitted from the FPGA.

18. The apparatus of claim 12, wherein the buffer memory includes a dual port random access memory.

19. The apparatus of claim 11, wherein the FPGA includes a transmit packet block configured to generate a signal indicating the vacant time slot.

* * * * *